H. NEWBOLD.
APPARATUS FOR THE PRODUCTION OF TORIC OR TOROIDAL SURFACES OF SPECTACLE AND EYEGLASS LENSES.
APPLICATION FILED AUG. 11, 1913.

1,154,199.

Patented Sept. 21, 1915.

WITNESSES.
J. K. Moore
Robt E Barry

INVENTOR
Harry Newbold
By Whitaker Prevost
attys.

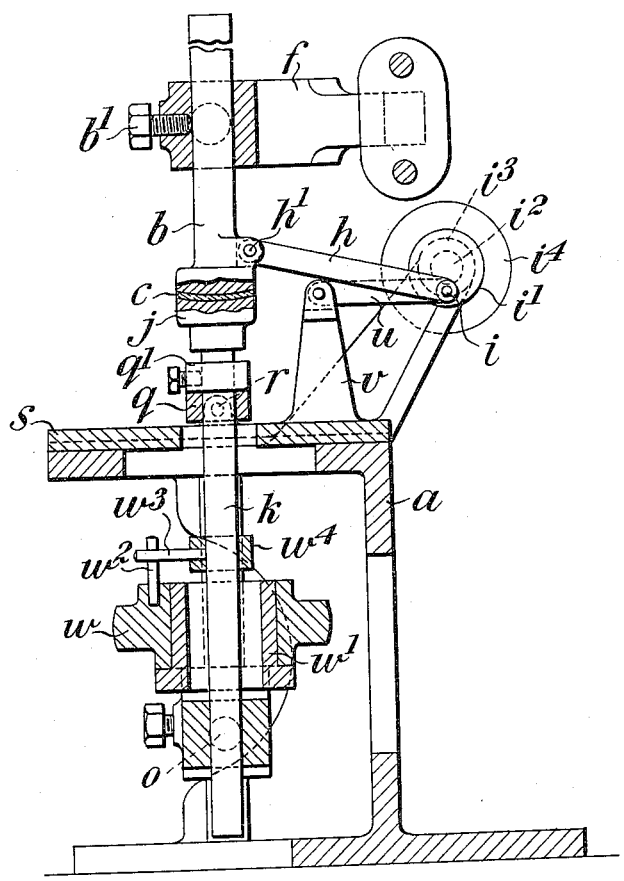

UNITED STATES PATENT OFFICE.

HARRY NEWBOLD, OF HOLYWELL, ST. ALBANS, ENGLAND.

APPARATUS FOR THE PRODUCTION OF TORIC OR TOROIDAL SURFACES OF SPECTACLE AND EYEGLASS LENSES.

1,154,199.  Specification of Letters Patent.  Patented Sept. 21, 1915.

Application filed August 11, 1913. Serial No. 784,218.

*To all whom it may concern:*

Be it known that I, HARRY NEWBOLD, a subject of the King of Great Britain, residing at Holywell, St. Albans, Hertfordshire, England, have invented a new and useful Improved Apparatus for the Production of Toric or Toroidal Surfaces of Spectacle and Eyeglass Lenses, of which the following is a specification.

My invention relates to a novel apparatus for the production of what are known as toric or toroidal surfaces of lenses of spectacles and eyeglasses.

According to the invention I mount the glass to be ground upon the end of a rod or the equivalent so arranged that it can impart to the glass a swinging or pendulous motion in one plane and enable it to be ground to a desired predetermined radius. This motion is imparted to the glass in such a manner that the exposed surface of the latter, that is to say, the surface which is to be ground moves in contact with a spherical grinding tool which is at the same time rotated. The result is that the glass is ground in one meridian to the radius determined by the rod or the equivalent and in the meridian at right angles thereto to the radius given by the spherical tool.

I also provide means whereby the rotating spherical grinding tool has an oscillating motion imparted to it similarly to the glass being ground, the result being that the lens obtained has a focus which varies to an extent depending on the radius of curvature of the arc through which the tool swings.

To enable my invention to be fully understood, I will describe it by reference to the accompanying drawings, in which:—

Figure 1:
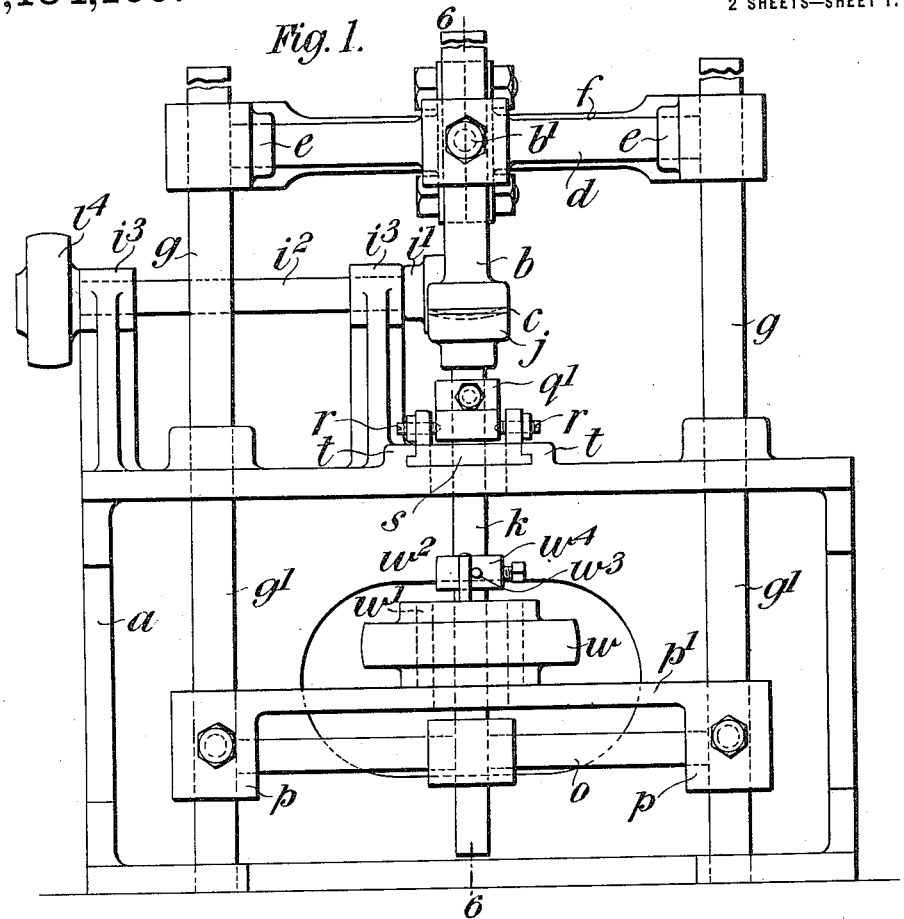
Figure 2:
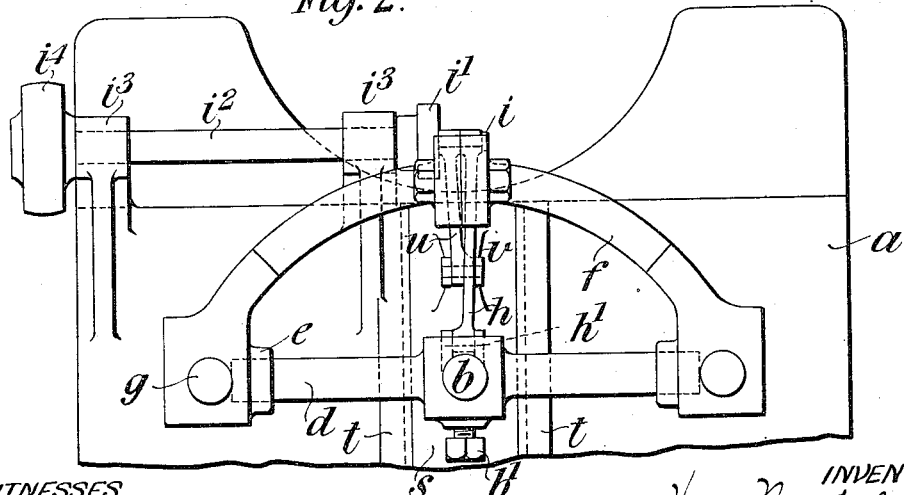

Figure 1 is a front elevation of a machine embodying my invention. Fig. 2 is a plan view thereof. Fig. 3 is a section on the line 6—6, Fig. 1.

Referring to the drawings, $a$ represents the frame or support of the machine and $b$ the rod upon the lower end of which the glass $c$ to be ground is mounted, the said rod $b$ being adjustably held by the set-screw $b^1$ in the cross-arm $d$, the ends of which are pivotally mounted and supported in bearings $e, e$ in the bracket $f$ which is loosely mounted upon the upright supports $g$, so that the glass $c$ is maintained in contact with the grinding tool, hereinafter described, by the action of gravity.

As above described, the rod $b$ carrying the glass to be ground has imparted to it a swinging or pendulous motion in one plane around the axis of the arm $d$ as a center and in the arrangement illustrated this motion is obtained by means of the connecting rod $h$ one end of which is hinged at $h^1$ to the lower end of the rod $b$ and the other end is carried by the pin $i$ of a crank-disk $i^1$ mounted upon the transverse spindle $i^2$ held in bearings $i^3$ upon the frame $a$ and adapted to be rotated by the pulley $i^4$.

$j$ is the spherical grinding tool in contact with which the glass $c$ to be ground moves when oscillated by the rod $b$, this spherical grinding tool $j$ being mounted upon the upper end of a rotary vertical spindle $k$, which is so mounted that while being rotated it is at the same time given an oscillating motion similar to, and in the same plane as that passed through by the rod $b$. For this purpose the spindle $k$ is carried at its lower end in a cross-arm $o$ which is pivotally mounted at its two extremities in bearings $p$ provided in the bracket or support $p^1$ which is adjustably mounted upon downward extensions $g^1$ of the supports $g$. The upper end of the spindle $k$ extends through a bearing block $q$ upon the upper end of which the collar $q^1$ keyed to the spindle $k$ bears, the said bearing block $q$ being carried in the pivot pins $r$ of the slide $s$ which is adapted to be reciprocated in a guide $t$ on the main frame $a$. The reciprocation of the slide $s$ is effected by means of a connecting rod $u$ which extends from the aforementioned crank pin $i$ to the upper end of a bracket $v$ provided at the rear end of the slide.

The oscillating spindle $k$ is rotated by means of the pulley $w$ which is rotatably mounted upon the bush $w^1$ through which the spindle $k$ passes and which is carried by the bracket $p^1$ and is furnished with a pin $w^2$ adapted to drive the spindle through the medium of the carrier pin $w^3$ connected to the collar $w^4$ keyed upon the said spindle.

From the foregoing it will be understood that the machine is employed and operated as follows: Assuming that the height of the arm $d$ has been adjusted vertically on the rod $b$ by means of the set screw $b^1$ to suit the particular lens to be ground and that the glass has been cemented to the usual pad upon the lower end of the rod $b$, the said rod is then caused to swing in one plane around the fulcrum formed by the arm $d$. The spherical grinding tool $j$ is at the same time rotated by the revolution of the spindle $k$, with the result that the glass while being ground in the one meridian by the swinging rod $b$, is simultaneously ground in the meridian at right angles thereto to the radius determined by the spherical tool $j$. With this construction of machine it will be obvious that the pendulous or swinging arm $b$ imparts an oscillating motion to the glass $o$ to be ground in the one meridian, while the rotating grinding tool at the same time passes through a curvilinear path in the same plane as that of the glass being ground; the result is that a lens is obtained of a toric or toroidal nature.

It will be understood that the constructions of machine above described and illustrated in the drawings are given as suitable examples only of means for carrying out the invention.

Claims.

1. A machine for grinding toric or like surfaces of lenses comprising a main frame, a lens carrying rod pivotally mounted on said frame and adapted to be oscillated and be freely movable vertically, means for oscillating said rod, a grinding tool mounted upon the upper end of a revoluble spindle, and means for oscillating the said spindle.

2. A machine for grinding toric or like surfaces of lenses comprising a main frame, vertical posts provided upon said frame, a bracket loosely mounted upon said vertical posts, a support pivotally mounted in said bracket, a lens carrying rod mounted in said support, means for oscillating said rod, a revoluble spindle located beneath said rod, a spherical grinding tool mounted upon the upper end of said spindle, and means for oscillating said spindle.

3. A machine for grinding toric or like surfaces of lenses comprising a main frame, a bracket loosely mounted for vertical movement on said frame, a support pivotally mounted in said bracket, a lens carrying rod having its upper end secured in said support, means connected to the lower end of said rod for oscillating the same, a revoluble spindle located beneath said rod, a spherical grinding tool mounted upon the upper end of said spindle and adapted to coöperate with said oscillating lens holder, and means for oscillating said spindle.

4. A machine for grinding toric or like surfaces of lenses, comprising a main frame, vertical posts provided in said frame, a bracket loosely mounted on the posts near their upper ends, a support pivotally mounted on said bracket, a lens carrying rod carried by said support, means for oscillating said rod, a subsidiary bracket mounted on said posts near their lower ends, a subsidiary support pivotally mounted in said subsidiary bracket, a spindle loosely mounted in said subsidiary support, an annular flange provided upon said subsidiary bracket, a pulley loosely mounted on said flange, a stud provided upon said pulley, a pin provided upon said spindle adapted to be engaged by said stud, for rotating said spindle, a spherical grinding tool mounted upon the upper end of said spindle, and means for oscillating said spindle.

HARRY NEWBOLD.

Witnesses:
JOHN E. BOUSFIELD,
C. G. REDFERN.